UNITED STATES PATENT OFFICE.

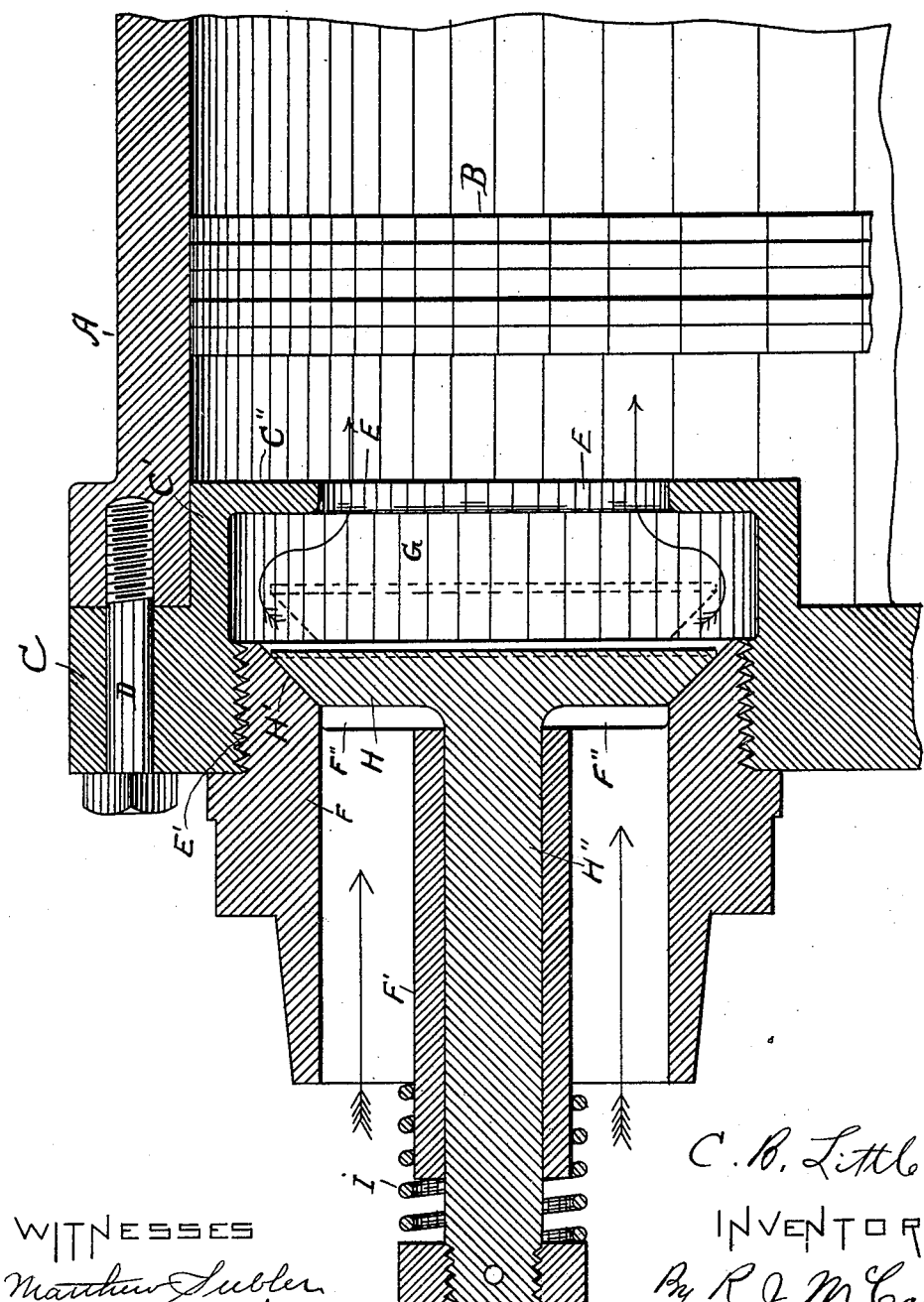

CLARENCE B. LITTLE, OF DAYTON, OHIO, ASSIGNOR TO THE BROWNELL & CO., OF SAME PLACE.

AIR-COMPRESSOR.

SPECIFICATION forming part of Letters Patent No. 678,839, dated July 16, 1901.

Application filed April 27, 1901. Serial No. 57,760. (No model.)

*To all whom it may concern:*

Be it known that I, CLARENCE B. LITTLE, a citizen of the United States, residing at Dayton, in the county of Montgomery and State of Ohio, have invented certain new and useful Improvements in Air-Compressors; and I do declare the following to be a full, clear, and exact description of the invention, such as will enable others skilled in the art to which it appertains to make and use the same, reference being had to the accompanying drawing, and to the letters of reference marked thereon, which forms a part of this specification.

This invention relates to improvements in air-compressors, and has specific reference to the cylinder-head in which the valves are mounted and through which the air is admitted to the cylinder under suction.

The object of the invention is to provide auxiliary valve or air chambers, by means of which the valves are prevented from entering the cylinder to any extent whatever in cases where said valves become broken or detached from their stems.

With air-compressors as now generally in use much annoyance and expense is incurred, owing to the valves becoming broken from their stems and drawn into the cylinder, where they come in contact with the moving piston and cause considerable damage to the compressor, often causing a breakage of the walls of the cylinder or the cylinder-head. By means of my invention this trouble is overcome. The valves in case of breakage are prevented from entering the cylinder, and the cylinder-head affords convenient means for removing the valve or valves thus affected and the replacing of new valves.

Preceding a detail description of my invention reference is made to the accompanying drawing, which shows a sectional elevation of a portion of a cylinder, a portion of a cylinder-head, one of the valves and its cage, and one of the auxiliary chambers.

Describing more specifically the same, A designates a compressor-cylinder. B is the piston therein. As before stated, the drawing represents a portion of the cylinder adjacent to one of the valves. It will be understood that there is a number of such valves arranged around the cylinder-head.

C designates the cylinder-head, which is bolted to the cylinder by means of a series of bolts D. This cylinder-head has an annular inwardly-projecting flange C', which fits into the mouth of the cylinder and terminates in a laterally and inwardly extending flange C'', which is provided with an air-opening E. The said head is provided with a series of interior screw-threads E'.

F designates a valve cage or casing which is screwed into the head. When the valve-casing is thus screwed into position in the head, there is provided a valve or air chamber G, which has a communication with the compressor-cylinder through the opening E.

H is a valve.

It is essential for the purposes of my invention that the diameter of the opening E be less than the diameter of the valve H. This valve moves into said chamber G, as indicated by the dotted lines, when the valve is drawn from its seat H' by the moving piston. The valve-stem H'' has a bearing in a sleeve F', which is an integral part of the valve-casing F, it being joined thereto by radial arms F''.

I designates a valve-seating spring which acts upon the valve H to seat the same when said valve is relieved of the pressure due to the moving piston.

In air-compressors, as before stated, there is more or less trouble experienced by the breaking of the valves at the stem. In such cases, as before intimated, the valve is drawn into the cylinder and is permitted to come in contact with the moving piston, with the results as before stated. This has been often known to occur in cases even where the broken valve has not entirely entered the cylinder, but only a portion thereof has been known to project into said cylinder when a breakage occurs.

It will be seen from the drawing of the present invention that in the event the valve becomes detached from its stem it will fall into the chamber G, and being of considerably greater diameter than the opening E it will be confined within said chamber where it is impossible to come in contact with the piston. The valve-casing F may be readily detached from the cylinder-head without interfering with or detaching said cylinder-head. This is a feature of great utility, as will be readily recognized by those familiar with air-compressors.

Having described my invention, I claim—

1. In an air-compressor, the combination with a compressor-cylinder, of a head secured thereto, the said head projecting into the cylinder and providing a chamber adapted to contain a valve and into which a valve is movable, an opening in said head forming a communication between the cylinder and said chamber, the diameter of such opening being essentially smaller than the diameter of the valve so that in the event of a breakage of said valve, it will not be permitted to enter the cylinder, a valve-casing mounted in said head, the said valve-casing and the valve forming the outer limit of the chamber, substantially as and for the purposes specified.

2. In an air-compressor, the combination with a compressor-cylinder, of a head secured thereto and having an auxiliary air-chamber in which the valve is confined, the said chamber being formed in that portion of the head which is projected into the cylinder, an opening forming a communication between the said air-chamber and the interior of the cylinder, the diameter of such opening being essentially less than the diameter of the valve, a valve-casing mounted in said head and forming the outer inclosure of the chamber, so that in the opening of the valve, the said valve is confined within said chamber, and whereby in the event of a breakage of said valve, the latter will be prevented from entering the compressor-cylinder, substantially as shown and described.

In testimony whereof I affix my signature in presence of two witnesses.

CLARENCE B. LITTLE.

Witnesses:
  R. J. McCARTY,
  J. A. WORTMAN.